March 9, 1965 G. W. MEYERS 3,172,821
FUEL ELEMENTS

Filed April 30, 1959 2 Sheets-Sheet 1

INVENTOR
Gilbert Wayne Meyers
BY
ATTORNEY

March 9, 1965
G. W. MEYERS
3,172,821
FUEL ELEMENTS
Filed April 30, 1959
2 Sheets-Sheet 2
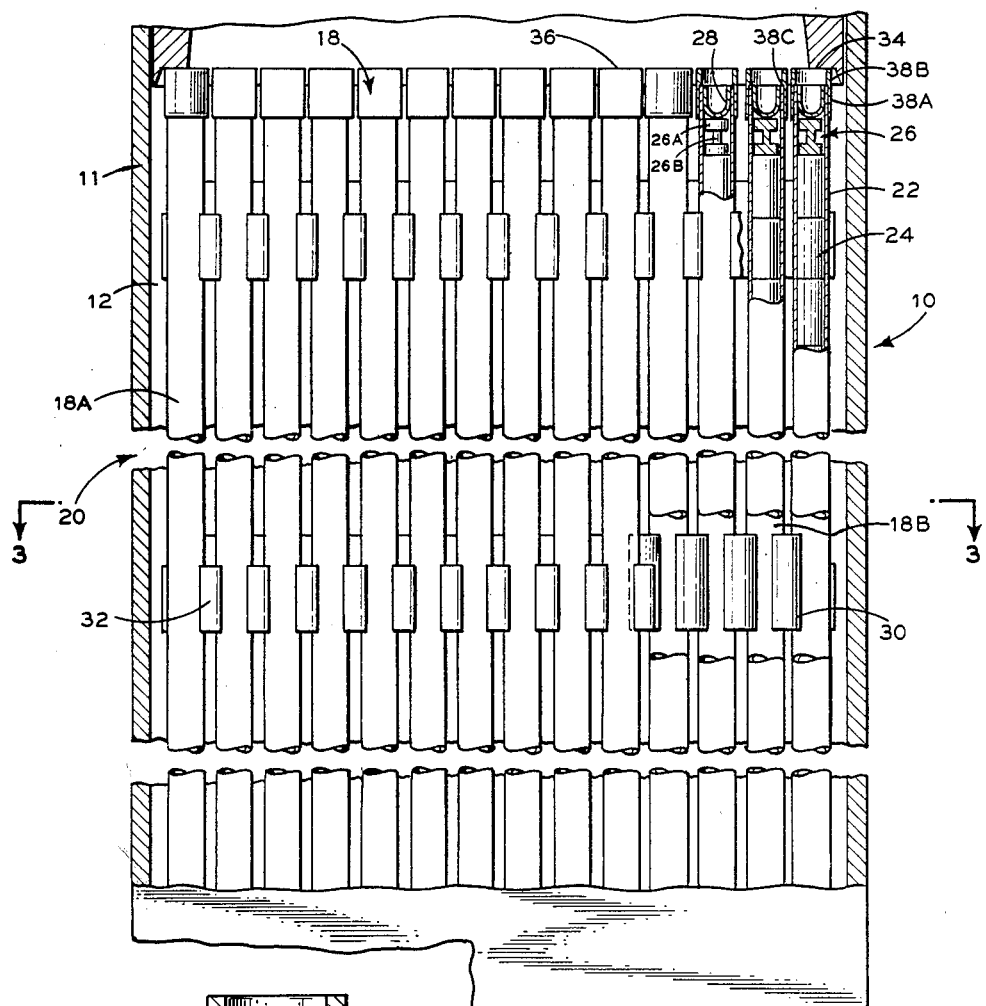
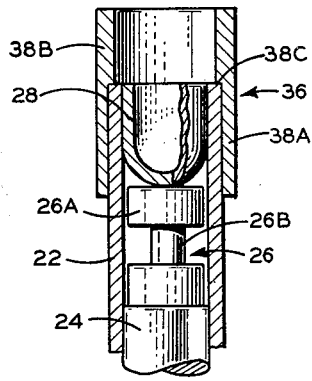
INVENTOR
Gilbert Wayne Meyers
BY
ATTORNEY

United States Patent Office 3,172,821
Patented Mar. 9, 1965

3,172,821
FUEL ELEMENTS
Gilbert Wayne Meyers, Los Angeles, Calif., assignor to The Babcock & Wilcox Company, New York, N.Y., a corporation of New Jersey
Filed Apr. 30, 1959, Ser. No. 809,970
2 Claims. (Cl. 176—78)

This invention relates in general to heterogeneous nuclear reactors and more particularly to a fuel element for use in a heterogeneous nuclear reactor.

In heterogeneous nuclear reactors a fissionable material and a moderator are arranged as discrete bodies usually in a geometric pattern to form a core in which a fission chain reaction can be produced. Heat generated within the core by the chain reaction is in turn converted into useful energy. In order to provide for the efficient use of the heat generated, particularly when it is used for the commercial generation of power, the arrangement of fissionable material, or fuel as it is usually referred to, within the core and the provision for the flow of coolant about the fuel are factors of great importance.

In heterogeneous reactors the core generally consists of a number of fuel elements. The fuel element is the basic unit within which the fuel is arranged for the assembly of the core and is made up usually of a number of fuel components. These fuel components contain the fissionable material, generally in combination with a fertile material. A fertile material is one that is capable of being transformed into fissionable material by the capture of a neutron. A common example is thorium, which decays through the intermediate element protactinium to yield a fissionable isotope of uranium ($U^{233}$).

One of the problems that has existed in the operation of heterogeneous nuclear reactors has been the uneven distribution of power within the core. Because of this it has been difficult to produce a specified power level in the core without the risk of a burnout of some elements while others operate at uneconomically low levels. A burnout generally occurs when the amount of heat generated in the fuel is greater than the coolant can remove. A burnout will result in the failure of a fuel element and is usually caused either by maximum power peaking within a portion of the core or by the blocking of a coolant flow channel.

An object of this invention is to provide a fuel element arrangement wherein the fuel components are securely positioned and spaced. This arrangement prevents any excessive bowing or misalignment of the fuel components which could cause the blockage of a coolant flow channel and result in overheating and eventual burnout or failure of the fuel element.

Additionally, the present invention provides means for spacing the fuel components within the fuel element. First, the fuel components are spaced from one another by short tubular internal ferrules which are integrally attached to the fuel components to provide a unitary bundle. A number of short tubular peripheral ferrules are positioned between and integrally attached to the peripheral fuel components and extend beyond the perimeter of the bundle of fuel components to provide bumpers which protect the fuel components from contact with adjoining surfaces.

The various features of novelty which characterize the invention are pointed out with particularity in the claims annexed to and forming a part of this specification. For a better understanding of the invention, its operating advantages and specific objects attained by its use, reference should be had to the accompanying drawings and descriptive matter in which a certain specific embodiment of the invention is illustrated and described.

Of the drawings:

FIG. 2 is a partial elevation view of a preferred embodiment of the fuel element shown partly in section and taken along the line 2—2 in FIG. 3;

FIG. 4 is an enlarged partial vertical section of the fuel pin shown in FIG. 2.

Figure 1:
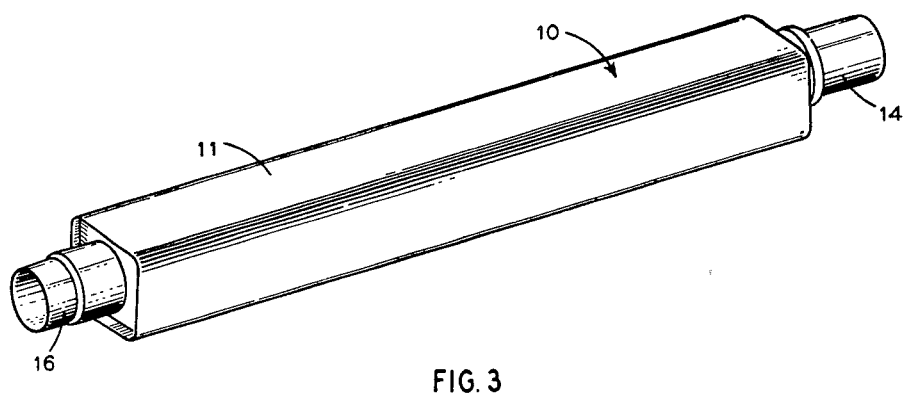
FIG. 1 is a three dimensional view of a preferred embodiment of the fuel element.
Figure 3:
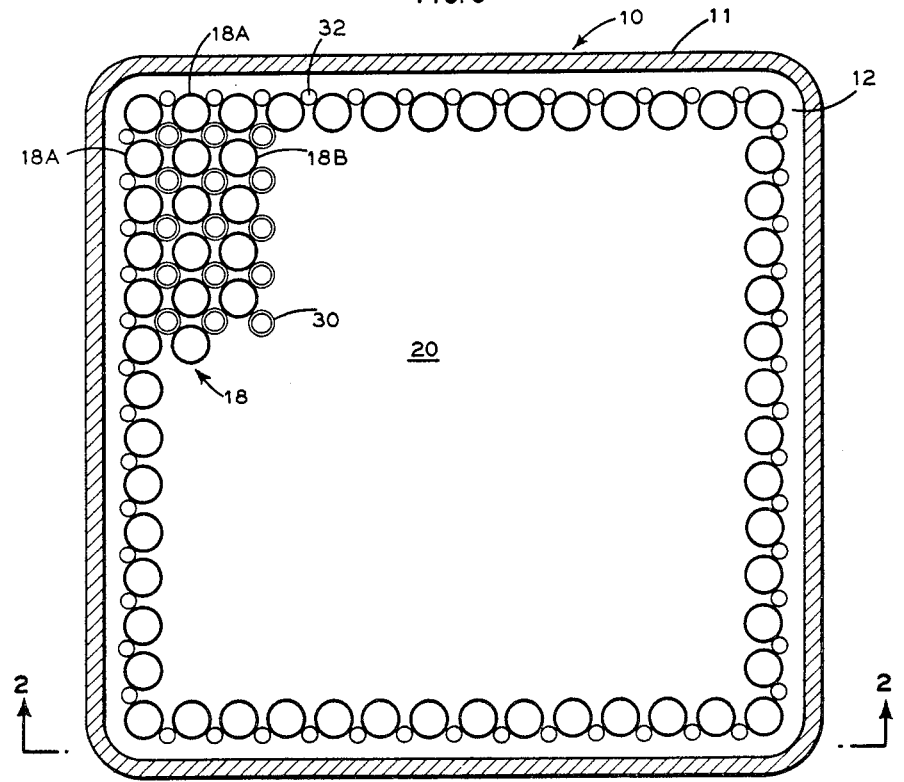
FIG. 3 is a horizontal cross-section of the fuel element taken along a line 3—3 in FIG. 2.

Referring now to the drawings, FIG. 1 shows the exterior arrangement of a preferred embodiment of the fuel element 10. The fuel element 10 comprises walls 11 forming an elongated flow chamber 12 of generally square cross-section. An inlet opening 14 is positioned at one end of the flow chamber and an outlet opening 16 is arranged at the opposite end thereof.

For a typical example of a heterogeneous nuclear reactor within which the fuel element of this invention could be used, reference is made to the reactor illustrated and described in the co-pending application of the common assignee, Serial No. 712,512, M. F. Sankovich, filed January 31, 1958, refiled October 9, 1961, as Serial No. 145,012. The reactor shown in the co-pending application is of the pressurized water type in which pressurized water acts both as the coolant and moderator. The fuel element as shown therein is vertically arranged and placed within the core so that the coolant, which removes the heat generated in the nuclear fission chain reaction, flows upwardly both through and about the exterior of the fuel element.

The fuel element 10 contains a number of vertically elongated fuel pins 18 uniformly spaced in a square lattice to form a bundle 20 of generally square cross-section. The cross-sectional area of the bundle is slightly smaller than the interior cross-sectional area of the flow chamber 12 so that the perimeter of the bundle is closely spaced from the walls 11 of the flow chamber.

Each of the fuel pins 18 (FIGS. 2 and 4) comprises an elongated open-ended tube 22 of circular cross-section. A column of cylindrically shaped fuel pellets 24 are arranged in end-to-end relationship within the tube. The pellets are formed of a mixture of fissionable and fertile material. A metallic insulating pellet 26 is positioned at the end of the column of fuel pellets. The end of the tube 22 is sealed by a hollow hemispherical end cap 28 which is integrally joined to the tube.

The metallic insulating pellet 26 is formed in the shape of a dumb-bell. It has two similar circular end portions 26A which have cross-sectional areas substantially equal to the cross-sectional area of the fuel pellets. These end portions are separated by a circular middle portion 26B having a cross-sectional area considerably smaller than that of the end portions. The shape of the insulating pellet makes it particularly adaptable for reducing the thermal stresses in the end caps.

The fuel pins 18 of the bundle 20 are divided into peripheral and internal fuel pins 18A, 18B, respectively. The peripheral fuel pins 18A contain a lower fissionable material content than that of the internal fuel pins 18B. The purpose of this arrangement is to avoid the power peaking which occurs in the flow channels between fuel elements. This power peaking results from an increase in the thermal neutrons caused by the effect of the moderator in regions within the core where the quantity of coolant is the largest. Since the peripheral fuel pins are closest to the coolant flow channels between fuel elements by reducing their fissionable material content the localized power peaking is reduced and a more uniform power distribution throughout the core is obtained.

In addition to the variation of the fuel concentration between the peripheral fuel pins 18A and the internal fuel pins 18B the corner peripheral fuel pins are further varied as to content. In the corner peripheral fuel pins the fuel pellets at each end contain the same ratio of fissionable to fertile material as contained in the other peripheral fuel pins, however, the fuel pellets in the longitudinal middle third of the pin contain only fertile material.

It has been found that bundles of fuel pins within the core of a nuclear reactor tend to bow in a radial direction away from the center of the core. Due to the arrangement of the bundle of fuel pins in the preferred embodiment illustrated herein the tendency is for the bundle to bow diagonally across the flow chamber away from the center of the core. When this occurs the longitudinal mid-portion of the corner peripheral fuel pins most remote from the center of the core will come in contact with the wall 11 of the flow chamber 12 and the flow of coolant thereabouts will be blocked. Since, originally there is no fissionable material within the mid-portion of this corner peripheral fuel pin the only heat generated therein by the fission reaction will occur after the fertile material begins its transformation into fissionable material. The quantity of heat generated within this mid-portion will be considerably less than that generated within the end portions which contain both fissionable and fertile material. Therefore, the flow of coolant in the vicinity of the area of contact will be sufficient to remove the heat generated in the mid-portion and to avoid failure of the corner peripheral fuel pin due to overheating.

Short round tubular internal ferrules 30 are placed within the bundle 20 with their central axes in parallel relationship with the longitudinal axis of the fuel pins 18 to space the pins. The internal ferrules 30 are located in a number of equally spaced parallel transverse planes along the length of the bundle. Like the fuel pins the ferrules are arranged in a square pattern with each ferrule contacting four fuel pins. The ferrules and fuel pins are integrally connected to form a unitary bundle.

Short round tubular peripheral ferrules 32 smaller both in length and diameter than the internal ferrules 30 are disposed between and integrally joined to the peripheral fuel pins 18A. The peripheral ferrules 32 are disposed in common transverse planes with the internal ferrules 30 and their central axes are in coparallel relationship. The peripheral ferrules are positioned wholly outside a longitudinal plane which extends through the central axes of the peripheral fuel pins. A longitudinal portion of the peripheral ferrules projects transversely beyond the perimeter of the bundle of fuel pins. In the event the bundle of fuel pins bows toward a wall of the flow chamber the portion of the peripheral ferrules projecting beyond the bundle will act as a bumper to keep the peripheral fuel pins in spaced relationship from this wall. By maintaining this spaced relationship proper cooling of the peripheral fuel pins can be sustained and the possibility of failure due to overheating avoided.

The bundle 20 is positioned within the flow chamber 12 so that each end of the peripheral fuel pins of the bundle 20 bears against a shoulder 34 (FIG. 2). Because of manufacturing tolerances there is the problem of maintaining even bearing of the peripheral fuel pins against this shoulder. To achieve even bearing end support sleeves 36 are provided which fit over the ends of the peripheral fuel pins and are integrally attached thereto. These sleeves are formed of short lengths of circular tubing having a uniform outside diameter. However, the interior of the sleeve is divided longitudinally into a first and a second section 38A, 38B, each having a different inside diameter. The first section 38A has a diameter sufficiently large to permit it to fit closely over the end of the fuel pin. The second section 38B extends axially from the end of the fuel pin and has an inside diameter which is smaller than the diameter of the fuel pin. The difference in the inside diameters provides a shoulder 38C against which the transverse end edge of the fuel pin rests.

The length of the second section 38B is greater than the sum of the allowable plus and minus tolerances of the fuel pins. Due to this feature the ends of the second sections will extend beyond the ends of all the peripheral fuel pins. To provide peripheral fuel pins of uniform length between the bearing surfaces the second sections 38B are cut off in a plane perpendicular to the longitudinal axis of the bundle and beyond the ends of any of the fuel pins. In this way all of the peripheral fuel pins with the end support sleeves attached will be of equal length and the length or structure of the peripheral fuel pins themselves will not be altered or affected.

The fitting placed on the ends of the peripheral fuel pins has been illustrated and described as a sleeve fitting over the end of the pin. However, it should be understood that other fittings which provide a section projecting axially from the ends of the fuel pins could also be used.

The following is a list of the materials and nominal dimensions for a preferred embodiment of the fuel element described herein:

Fuel element:
Fuel _____ $ThO_2$-$UO_2$ mixture.
Fuel pin tube _____ 304 stainless steel.
Fuel element walls _____ Zircaloy-2.
Ferrules _____ 304 stainless steel.
Insulating pellet _____ 303 stainless steel.
Fuel pellet diameter _____ 0.2625 in.
Insulating pellet diameter ___ 0.2625 in.
Insulating pellet length _____ 0.250 in.
Fuel pin tube diameter _____ 0.304 in.
Fuel pin tube thickness _____ 0.020 in.
Fuel pin tube length _____ 102 in.
Fuel pin spacing (square lattice) _____ 0.374 in. nominal.
Active fuel length per fuel pin _____ 98.5 in.
Internal ferrule—O.D. _____ 0.225 in.
Internal ferrule—I.D. _____ 0.189 in.
Internal ferrule—length ____ 0.750 in.
Peripheral ferrule—O.D. ___ 0.125 in.
Peripheral ferrule—I.D. ____ 0.095 in.
Peripheral ferrule—length __ 0.50 in.
Spacing of ferrule planes ___ 8.32 in.
Number of ferrule planes ___ 13.
Fuel element—outside width _ 5.701 in.
Fuel element—wall thickness_ 0.155 in.
End support sleeve—length __ 0.44 in.
End support sleeve—length:
   First section _____ 0.25 in.
   Second section _____ 0.19 in.
End support sleeve—O.D. ___ 0.368 in.
End support sleeve—I.D.:
   First section _____ 0.312 in.
   Second section _____ 0.218 in.
Typical concentration of $U^{235}$ in fuel pins:
   Peripheral fuel pin _____ 29.69 gm./pin.
   Corner peripheral fuel pin___ 19.90 gm./pin.
   Internal fuel pin _____ 37.12 gm./pin.
   Total fissionable and fertile material _____ 800 gm./pin.

This invention contributes a simple, economical arrangement for spacing a bundle of fuel pins within a fuel element. The combined use of peripheral and internal ferrules integrally joined to the fuel pins provides an easily constructed bundle wherein the fuel pins are secured against misalignment or movement which would interfere with the flow of coolant therethrough. Additionally, the ferrules cause only a minimum pressure drop in the coolant as it flows through the fuel element thereby effecting savings in the pumping required for the passage of coolant through the reactor. Moreover, the end support sleeves supply means whereby even end bearing of the bundle within the fuel element is achieved without any alteration of the fuel pins.

Therefore, this invention provides a fuel element which avoids blockage of coolant flow channels which would result in overheating and subsequent fuel element failure.

Although the fuel element has been illustrated as square, it is possible that it may take other shapes such as rectangular or polygonal. It also should be understood that a circular fuel element could be used. However, in such an arrangement there would be no corner peripheral fuel pins. While the preferred embodiment of the fuel element is shown having an enclosing container it is possible that the arrangement disclosed herein could be used to equal advantage without the enclosing container.

Further the fuel pins and ferrules are not restricted to a circular transverse cross-section. It is contemplated that other shapes could be used, for example elliptical, square, or triangular. The preferred method of integrally joining the ferrules and the end support sleeves to the fuel pins to form a unitary bundle is by brazing. However, other methods of integral attachment might be used.

While in accordance with the provisions of the statutes I have illustrated and described herein the best form of the invention now known to us, those skilled in the art will understand that changes may be made in the form of the apparatus disclosed without departing from the spirit of the invention covered by my claims, and that certain features of my invention may sometimes be used to advantage without a corresponding use of other features.

What is claimed is:

1. A fuel element for use in a nuclear reactor comprising walls forming an elongated flow chambes, end bearing surfaces within said flow chamber, a plurality of elongated circular fuel pins arranged in a regular pattern to form a bundle, said bundle comprising interior fuel pins surrounded laterally by peripheral fuel pins, said peripheral fuel pins arranged to extend between said end bearing surfaces, said bundle positioned within said flow chamber, end support sleeves integrally attached to the peripheral fuel pins in said bundle and having longitudinally extending first and second sections, the first section of said end support sleeves arranged to fit closely over the end of the peripheral fuel pins and the second section having an inside diameter smaller than that of the first sections and extending axially from the end of the peripheral fuel pins whereby the second sections of said fittings extending beyond said fuel components can be cut off to provide combined peripheral fuel pins and end support fittings of equal length between said end bearing surfaces.

2. A fuel element for use in a nuclear reactor comprising walls forming an elongated flow chamber of polygonal transverse cross-section, end bearing surfaces within said flow chamber, a plurality of uniformly spaced elongated circular fuel pins disposed in a square lattice to form a bundle having substantially the same transverse cross-sectional shape as said flow chamber, said bundle comprising interior fuel pins surrounded laterally by peripheral fuel pins, said peripheral fuel pins arranged to extend between said end bearing surfaces, said bundle arranged within and closely spaced from the walls of said end support sleeves integrally attached to the peripheral fuel pins of said bundle having longitudinally extending first and second sections, the first section of said end support sleeves arranged to fit closely over the end of the peripheral fuel pins and the second section having an inside diameter smaller than that of the first section and extending axially from the end of the fuel pins whereby the second sections of said fittings extending beyond said fuel components can be cut off to provide combined peripheral fuel pins and end support fittings of equal length between said end bearing surfaces.

References Cited in the file of this patent

UNITED STATES PATENTS

| | | |
|---|---|---|
| 2,806,819 | Christy et al. | Sept. 16, 1957 |
| 2,841,545 | Zinn | July 1, 1958 |
| 2,848,404 | Treshow | Aug. 19, 1958 |
| 2,851,410 | Vernon et al. | Sept. 9, 1958 |
| 2,852,456 | Wade | Sept. 16, 1958 |
| 2,863,816 | Stacy | Dec. 9, 1958 |
| 2,870,076 | Koch | Jan. 20, 1959 |
| 2,879,216 | Hurwitz et al. | Mar. 24, 1959 |
| 2,982,713 | Sankovich et al. | May 2, 1961 |
| 2,986,509 | Duffy | May 30, 1961 |
| 3,030,291 | Butler et al. | Apr. 17, 1962 |

FOREIGN PATENTS

| | | |
|---|---|---|
| 559,078 | Belgium | July 31, 1957 |
| 564,208 | Belgium | Feb. 15, 1958 |
| 818,028 | Great Britain | Aug. 12, 1959 |

OTHER REFERENCES

AEC document, TID–7529 (pt. 1), Heat Transfer Report given Nov. 1 and 2, 1956, pp. 248–257.

Progress Report on Dresden Power Station, Nov. 26, 1956, GER–1301, General Electric Co. publication.

AEC document NAA–SR–1936, Sept. 1, 1957, in particular page 21.